United States Patent [19]

Hasegawa et al.

[11] Patent Number: 4,897,670

[45] Date of Patent: Jan. 30, 1990

[54] THERMAL TRANSFER PRINTER

[75] Inventors: Tai Hasegawa; Masatoshi Matsuzaki; Jun Monnai, all of Kobe, Japan

[73] Assignee: Konica Corporation, Tokyo, Japan

[21] Appl. No.: 212,556

[22] Filed: Jun. 28, 1988

[30] Foreign Application Priority Data

Jun. 30, 1987 [JP] Japan ............................... 62-164987

[51] Int. Cl.[4] .......................... G01D 15/10; B41J 3/20

[52] U.S. Cl. ................................ 346/76 PH; 400/56; 400/120; 400/55

[58] Field of Search ....................... 346/76 PH, 139 R; 400/55, 56, 120

[56] References Cited

U.S. PATENT DOCUMENTS 4,685,815 8/1987 Baranyi .............................. 400/120

4,710,040 12/1987 Grey .................................. 400/55

*Primary Examiner*—Bruce A. Reynolds

*Assistant Examiner*—Gerald E. Preston

*Attorney, Agent, or Firm*—Finnegan, Henderson, Farabow, Garrett and Dunner

[57] ABSTRACT

A thermal transfer printer includes a head holding member for holding a printing head and for applying an urging force for urging the printing head against a platen and separating the printing head from the platen. An elastic member biases the head holding member to urge the printing head against the platen. A regulating member regulates displacement of the elastic member to change the urging force of the printing head against the platen. A driving unit drives the regulating member. A detecting unit detects either one or both of the type of ink ribbon or the surface roughness of recording paper. A control unit controls the driving unit in accordance with the result of the detecting unit. The urging force of the printing head is thus changed in accordance with either one or both of the type of ink ribbon or the surface roughness of the recording paper.

17 Claims, 7 Drawing Sheets

THERMAL TRANSFER PRINTER

BACKGROUND OF THE INVENTION

1. Field of the Invention

The present invention relates to a thermal transfer printer.

2. Description of the Prior Art

A thermal transfer printer incorporates a head urging apparatus for urging a printing head against a platen in a printing step and for releasing urging of the printing head against the platen in a returning step wherein the printing head is returned to a printing start position.

Known examples of a head urging apparatus of this type are an apparatus including an urging spring for biasing a head holding member in a direction of urging a printing head against a platen and a solenoid for attracting the head holding member in a direction along which the printing head moves away from the platen, and an apparatus using a cam which is rotated in a forward/reverse direction by a stepping motor, an urging spring for biasing a printing head in an urging direction, and a release spring for biasing the printing head in an urging release direction, thereby switching between urging and urging release. However, in either of the head urging apparatuses, an urging force of the printing head against the platen is fixed.

Recently, in order to satisfy various needs of users, demands have arisen for printing on copying machine (PPC) recording paper or so-called rough paper having a rough surface, color printing, high-speed printing, printing using a so-called multi-strike ribbon which can be used a plurality of times, printing on thermal paper for a teleprinter, and the like.

In order to perform good printing on rough paper having a rough surface, an ink ribbon suitable for the paper must be used and an urging force of a printing head against a platen must be set larger. However, if printing is performed on smooth paper under such conditions, transverse lines and scumming are generated. In color printing and high-speed printing, a soft ink ribbon is used. Therefore, if the urging force is kept strong, scumming is generated. In addition, when a multi-strike ribbon is printed with a strong urging force, traces of preceding printing are printed, i.e., a so-called ghost phenomenon occurs. Furthermore, if printing is performed on thermal paper with a strong urging force, tailings, feathering, and transverse lines are generated.

Japanese Patent Laid-Open No. 53-70447 discloses an apparatus in which an urging force of a printing head can be variably set in accordance with the type of thermal paper by operating a manual lever. However, when such an apparatus is used, a user must check the quality of thermal paper and set a head urging force in accordance with a check result, resulting in a troublesome operation for a user. In addition, it is difficult for a user who does not get used to a printer operation to check the quality of thermal paper. For this reason, a head urging force may be wrongly set to pose the same problems as in the fixed-urging force type apparatus.

SUMMARY OF THE INVENTION

It is an object of the present invention to provide a thermal transfer printer having a printing head urging apparatus capable of automatically setting an urging force of a printing head against a platen to be a suitable one for a printing purpose.

In order to achieve the above object of the present invention, there is provided a thermal transfer printer comprising: a head holding member for holding a printing head, and urging/separating the printing head against/from a platen; an elastic member for biasing the head holding member so that the printing head is urged against the platen when the head holding member is located at an urging position; a regulating member for regulating displacement of the elastic member to change an urging force of the printing head against the platen; driving means for driving the regulating member; detecting means for detecting the type of an ink ribbon and/or surface roughness of recording paper; and control means for controlling the driving means in accordance with a detection result of the detecting means, wherein the urging force of the printing head is changed in accordance with the type of an ink ribbon and/or surface roughness of recording paper.

BRIEF DESCRIPTION OF THE DRAWINGS

FIGS. 5A and 5B are schematic views showing an arrangement of an ink ribbon cassette discriminator, in which FIG. 5A shows a state wherein an ink ribbon cassette for paper having a smooth surface or color printing is mounted on a carriage, and FIG. 5B shows a state wherein an ink ribbon cassette for rough paper is mounted on a carriage;

DETAILED DESCRIPTION OF THE PREFERRED EMBODIMENT

Figure 1:
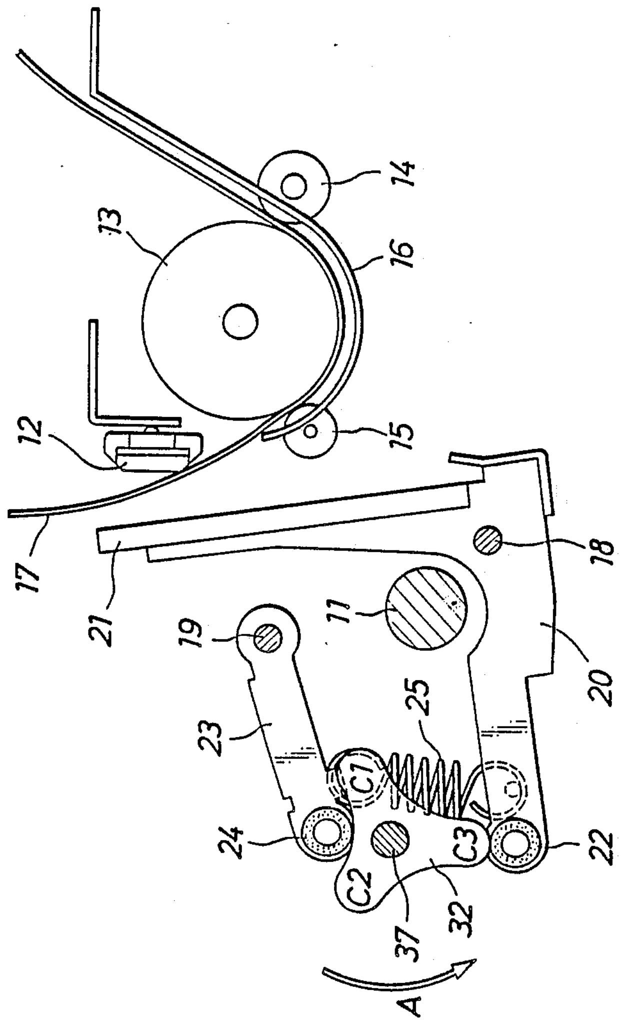
FIG. 1 is a partially cutaway side view showing an urging released state of a printing head urging apparatus according to an embodiment of the present invention.
Figure 2:
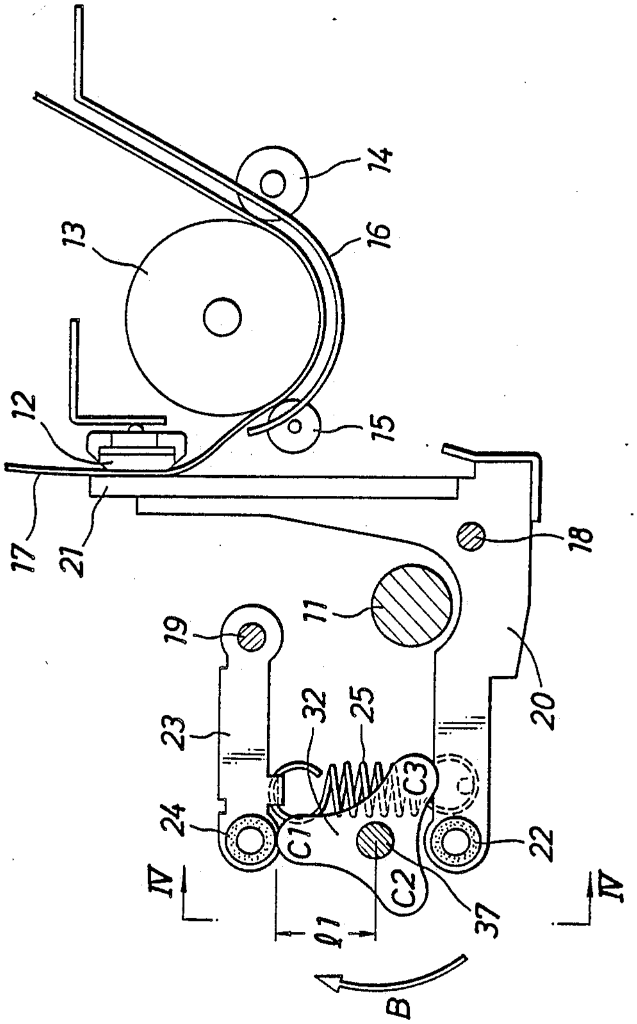
FIG. 2 is a partially cutaway side view of a strong urging state of the printing head urging apparatus in FIG. 1.
Figure 3:
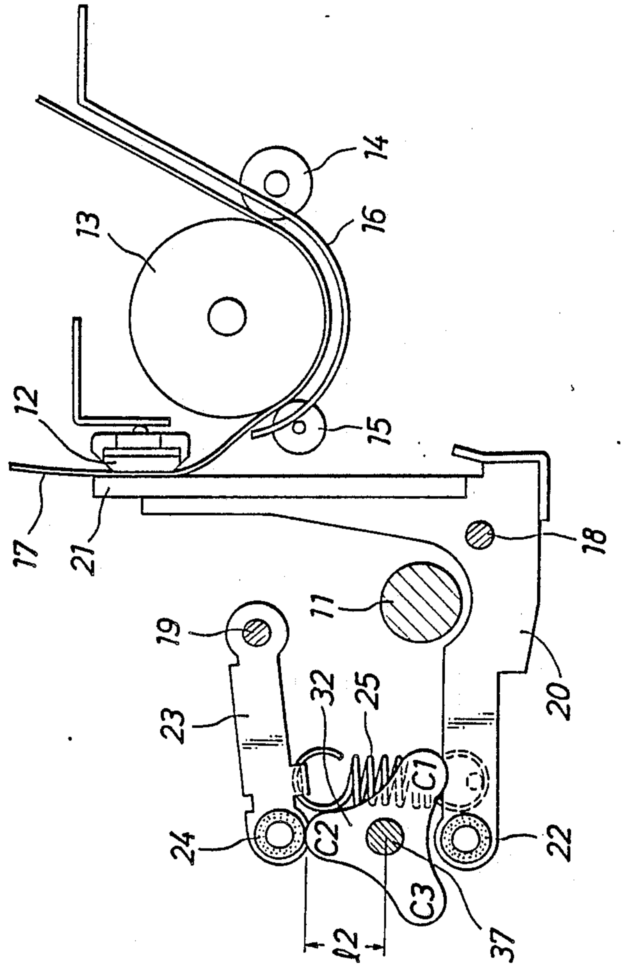
FIG. 3 is a partially cutaway side view showing a weak urging state of the printing head urging apparatus in FIG. 1.
Figure 4:
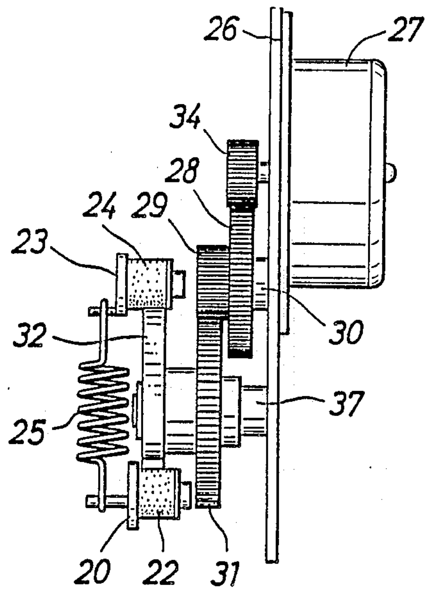
FIG. 4 is a view taken along the line IV—IV in FIG. 2.

FIGS. 1 to 4 show a main part of a printing head urging apparatus of a thermal transfer printer, in which FIG. 1 shows an urging released state, FIG. 2 shows a strong urging state, and FIG. 3 shows a weak urging state. A carriage guide rail 11, a platen 12, a paper feed roller 13, and urging rollers 14 and 15 are disposed parallel to each other on a frame (not shown) of a thermal transfer printer. A paper feed guide 16 is arranged along a lower half portion of the paper feed roller 13. Recording paper 17 is sandwiched between the paper feed roller 13 and the urging rollers 14 and 15 and fed along the guide 16.

A carriage (not shown) is mounted on the guide rail 11, and a head urging apparatus is mounted on the carriage as follows.

Two support shafts 18 and 19 are mounted on the carriage so as to be substantially parallel to the guide rail 11. A middle portion of a substantially L-shaped head holding member 20 is pivotally fixed to the first support shaft 18. A printing head 21 is mounted on a portion of the head holding member 20 extending from the support shaft 18 at a side facing the platen 12. A roller (cam follower) 22 is mounted on an end of a portion extending from the support shaft 18 in a direction opposite to the platen 12. One end portion of a pivoting member (movable member) 23 is pivotally fixed to the second support shaft 19. A roller (cam follower) 24 is fixed at the other end of the pivoting member 23 extending from the support shaft 19 in a direction opposite to the platen 12. A compression coil spring 25 is disposed between a portion of the head holding member 20 closer to the roller 22 and a portion of the pivoting member 23 closer to the roller 24, and biases the rollers 22 and 24 toward each other. A stepping motor (printing head motor) 27, a gear shaft 30 formed integrally with a large gear 28 and a small gear 29, and a cam shaft 37 formed integrally with a large gear 31 and a cam 32 are arranged parallelly to the guide rail 11 on a frame 26 of the carriage. The roller 22 of the head holding member 20 and the roller 24 of the pivoting member 23 sandwich the cam 32 from both sides by an elastic force of the spring 25. The small gear 34 mounted on the motor 27 meshes with the large gear 28 of the gear shaft 30, and the small gear 29 of the gear shaft 30 meshes with the large gear 31 of the cam shaft 37.

The cam 32 has first to third outward projections C1, C2, and C3 spaced apart from each other by intervals of 120° in the circumferential direction. The first outward projection C1 is used for strong urging, the second outward projection C2 is used for weak urging, and the third outward projection C3 is used for releasing urging. A length l1 from the center of the cam shaft 37 to the distal end of the first outward projection C1 is set longer than a length l2 from the center of the cam shaft 37 to the distal end of the second outward projection C2. The cam 32 is normally located at an urging release position at which the distal end of the third outward projection C3 abuts against the roller 22 of the head holding member 20, as shown in FIG. 1. When the motor 27 is driven, the cam 32 is set at a strong urging position at which the distal end of the first outward projection C1 abuts against the roller 24 of the pivoting member 23, or at a weak urging position at which the distal end of the second outward projection C2 abuts against the roller 24 of the pivoting member 23, as shown in FIG. 3.

The frame 26 of the carriage includes an urging release position detector 41 (FIG. 6) for detecting that the cam 32 is located at the urging release position, a strong urging position detector 42 (FIG. 6) for detecting that the cam 32 is located at the strong urging position, and a weak urging position detector 43 (FIG. 6) for detecting that the cam 32 is located at the weak urging position.

When the cam 32 is located at the urging release position as shown in FIG. 1, the roller 22 of the head holding member 20 is pushed downward by the third outward projection C3 of the cam 32 and located at a position separated from the rotation center shaft 37, and the printing head 21 is separated from the platen 12. The roller 24 of the pivoting member 23 abuts against the cam 32 by the spring 25 and is located at a position closer to the rotation center shaft 37. The urging release position detector 41 is turned on.

In order to set the strong urging state as shown in FIG. 2 from the urging release state as shown in FIG. 1, the cam 32 is rotated counterclockwise (direction indicated by arrow A in FIG. 1) to the strong urging position. When the cam 32 is rotated counterclockwise from the urging release position, the roller 24 of the pivoting member 23 is pushed upward by the first outward projection C1. Therefore, the pivoting member 23 is pivoted clockwise. The head holding member 20 is pulled by the spring 25 to pivot the roller 22 clockwise while the roller 22 is in contact with the cam 32. Therefore, the printing head 21 is moved toward the platen 12 and urged against the platen 12 before the cam 32 reaches the strong urging position. After the printing head 21 is urged against the platen 12, the cam 32 is rotated to the strong urging position. As a result, the pivoting member 23 is further pivoted upward, but the head holding member is almost not pivoted. Therefore, when the cam 32 is stopped at the strong urging position as shown in FIG. 2 and the roller 24 of the pivoting member 23 is lifted to a position farthest from the rotation center shaft 37, a gap of, e.g., several millimeters is formed between the roller 22 of the head holding member 20 and the cam 32, and the printing head 21 is urged against the platen 12 by an elastic force of the spring 25. When the cam 32 reaches the strong urging position, the strong urging position detector 42 is turned on.

In order to set the urging release state from the urging state as shown in FIG. 2, the cam 32 is rotated clockwise (direction indicated by arrow B in FIG. 2) to the urging release position. When the cam 32 is rotated from the strong urging position in the urging release direction to some extent, it abuts against the roller 22 of the head holding member 20 to push the roller 22 downward. Therefore, the head holding member 20 is pivoted counterclockwise, and the printing head 21 is separated from the platen 12. Along with rotation of the cam 32 and pivoting motion of the head holding member 20, the pivoting member 23 is pulled by the spring 25 to pivot the roller 24 counterclockwise while the roller 24 abuts against the cam 32. When the cam 32 is rotated to and stopped at the urging release position, the head holding member 20 and the pivoting member 23 return to the urging release state shown in FIG. 1.

In order to set the weak urging state as shown in FIG. 3 from the urging release state as shown FIG. 1, the cam 32 is rotated clockwise to the weak urging position. When the cam 32 is rotated clockwise from the urging release position, the roller 24 of the pivoting member 23 is pushed upward by the second outward projection C2, and the pivoting member 23 is pivoted clockwise. The head holding member 20 is pulled by the spring 25 to pivot the roller 22 clockwise while the roller 22 abuts against the cam 32. Therefore, the printing head 21 is urged against the platen 12 before the cam 32 reaches the weak urging position. In this case, when the cam 32 reaches the weak urging position, a gap is formed between the roller 22 of the head holding member 20 and the cam 32 as described above. The length l2 from the center of the cam shaft 37 to the distal end of the second outward projection C2 is shorter than the length l1 from the center of the cam shaft 37 to the first outward projection C1. Therefore, as shown in FIG. 3, an extension amount of the spring 25 obtained when the cam 32 is located at the weak urging position is smaller than that obtained when the cam 32 is located at the strong urging position. For this reason, an urging force obtained when the cam 32 is located at the weak urging position is weaker than that obtained when the cam 32 is located at the strong urging position. When the cam 32 reaches the weak urging position, the weak urging position detector 43 is turned on.

In order to set the urging release state from the weak urging state as shown in FIG. 3, the cam 32 is rotated counterclockwise to the urging release position.

FIG. 5 shows an ink ribbon cassette discriminator 44 mounted on the carriage. The ink ribbon cassette discriminator 44 consists of a pair of upper and lower contact elements 45 and 46 arranged spaced apart from each other on the lower surface of the carriage 38. The proximal ends of the contact elements 45 and 46 are fixed to the carriage 38. Contacts 47 and 48 are formed at opposing positions on the distal ends of the contact elements 45 and 46. A projection 49 is formed at the distal end of the contact element 45 and projects above the carriage 38 through a hole 39 formed in the carriage 38.

Figure 5A:
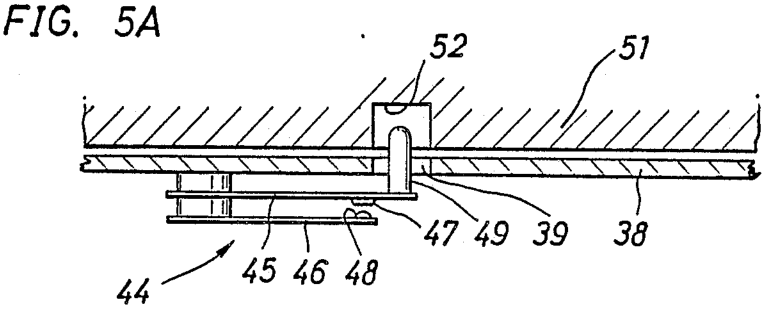

Examples of an ink ribbon cassette to be mounted on the carriage 38 are an ink ribbon cassette for rough paper having a rough surface, that for paper having a smooth surface, and that for color printing. An ink ribbon cassette 51 for paper having a smooth surface or for color printing has a recess portion 52 formed in its bottom wall at a position corresponding to the projection 49, as shown in FIG. 5A. When such a cassette is mounted on the carriage 38, the projection 49 is inserted in the recess portion 52. Therefore, the contacts 47 and 48 are not brought into contact with each other. When a cassette is not mounted on the carriage 38 as in direct thermal printing not using an ink ribbon, the contacts 47 and 48 are not brought into contact with each other.

Figure 5B:
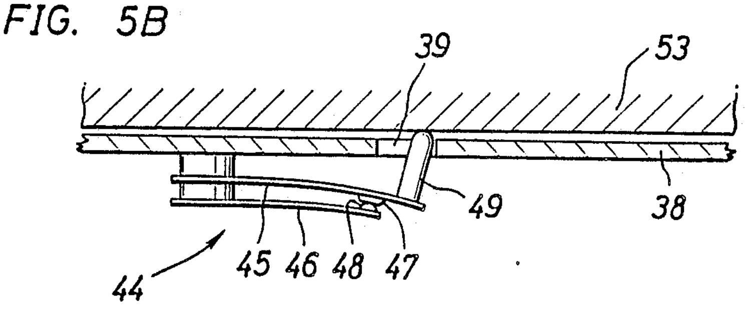

Meanwhile, as shown in FIG. 5B, an ink ribbon cassette 53 for rough paper having a rough surface does not have a recess portion formed in a bottom wall at a position corresponding to the projection 49. Therefore, when the cassette 53 is mounted on the carriage 38, the projection 49 is urged by the cassette 53, and the contacts 47 and 48 are brought into contact with each other. As a result, the ink ribbon cassette discriminator 44 outputs a rough paper ink ribbon cassette detection signal.

Figure 6:
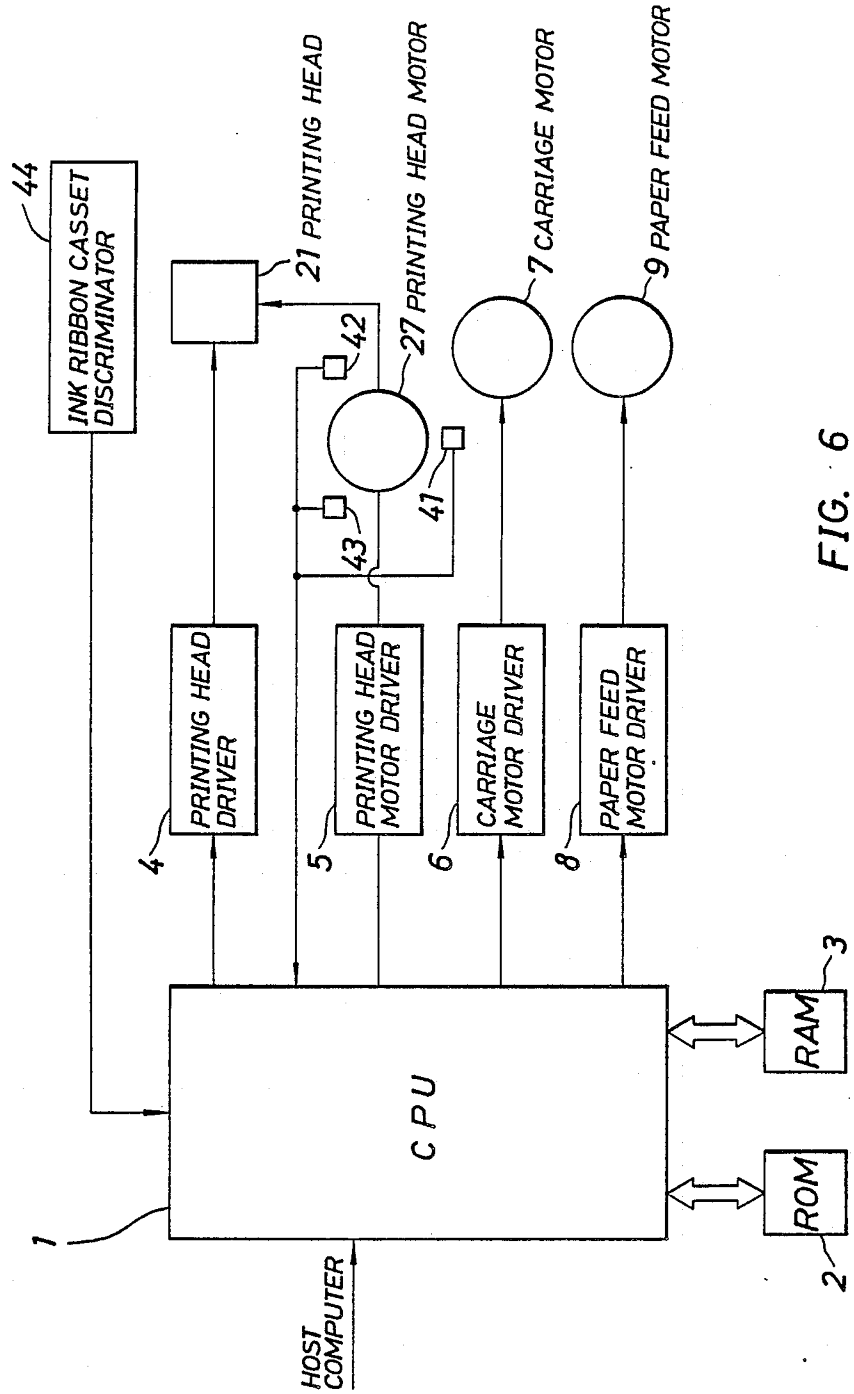
FIG. 6 is a block diagram showing an electrical arrangement of a printer.

FIG. 6 shows an electrical arrangement of a thermal transfer printer. The thermal transfer printer is controlled by a CPU 1. The CPU 1 includes a ROM 2 for storing programs and character patterns, and a RAM 3 for storing various data. Character code information is supplied to the CPU 1 from a host computer (not shown). The CPU 1 receives detection signals from the urging release position detector 41, the strong urging position detector 42, the weak urging position detector 43, and the ink ribbon cassette discriminator 44.

The CPU 1 supplies printing pattern information to a printing head driver 4. Heat generating members arranged in an array on the printing head 21 are selectively driven in accordance with the printing pattern information. The CPU 1 supplies a control signal for the printing head motor 27 to a printing head motor driver 5. The CPU 1 supplies a control signal for the drive motor (carriage motor) 7 of the carriage 38 on which the printing head 21 is mounted to a carriage motor driver 6. The CPU 1 supplies a control signal for the paper feed motor 9 to a paper feed motor driver 8.

When the rough paper ink ribbon cassette 53 is mounted on the carriage 38, the ink ribbon cassette discriminator 44 outputs a rough paper ink ribbon cassette detection signal to the CPU 1. In this case, when the head is urged, the printing head motor 27 is driven counterclockwise until the strong urging position detector 42 is turned on. That is, the cam 32 is set at the strong urging position. As a result, the printing head 21 is urged against the platen 12 with a comparatively strong urging force.

When the ink ribbon cassette 51 for paper having a smooth surface or color printing is mounted on the carriage 38 or when an ink ribbon cassette is not mounted on the carriage 38 as in direct thermal printing, the discriminator 44 does not output the rough paper ink ribbon cassette detection signal. In this case, when the head is urged, the printing head motor 27 is driven clockwise until the weak urging position detector 43 is turned on. That is, the cam 32 is set at the weak urging position. As a result, the printing head 21 is urged against the platen 12 with a comparatively weak urging force.

In the above embodiment, an urging force of the printing head urging apparatus is switched in accordance with the detection signal of the ink ribbon cassette discriminator. However, the urging force of the printing head urging apparatus may be switched in accordance with a detection signal from a detector for detecting surface roughness of recording paper.

Alternatively, the urging force of the printing head may be switched in accordance with both the type of an ink ribbon and the surface roughness of recording paper.

Figure 7:
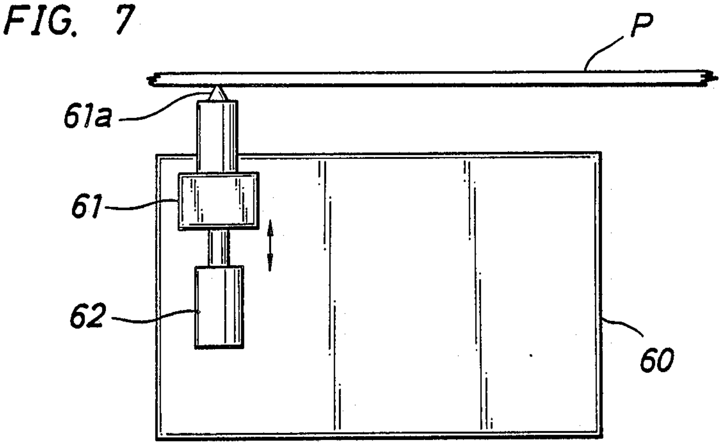
FIG. 7 is a view showing an embodiment of a surface roughness measuring device.

FIG. 7 shows an embodiment of a surface roughness measuring device. The surface roughness measuring device includes a needle contact type surface roughness detector 61 mounted on a carriage 60 so as to be moved toward and away from recording paper P, a driving device 62 for moving the detector 61 toward or away from the recording paper P, and a signal processor (not shown) for the detector 61. The detector 61 is normally located at a separated position spaced apart from the recording paper P and is moved to a contact position at which a contact needle 61*a* is brought into contact with the recording paper P, as shown in FIG. 7, when surface roughness measurement processing is to be performed. The surface roughness measurement processing is started by turning on a switch (not shown) before the printing processing is performed. When the switch is turned on after the recording paper P is set, the detector 61 is moved to the contact position, and the contact needle 61*a* is brought into contact with the printing surface of the recording paper P. Thereafter, the carriage 60 is moved in a printing direction by a predetermined distance. The contact needle 61*a* vibrates in accordance with undulations on the printing surface of the recording paper P, the detector 61 outputs a signal corresponding to the vibrations, and the surface roughness is obtained on the basis of the signal. The obtained surface roughness is stored in a memory or the like. Then, the detector 61 is returned to the separated position, and the carriage 60 is returned to the printing start position.

A relationship between the surface roughness and the urging force of the printing head is obtained by experiments beforehand and stored in a memory or the like so that printing is always suitably performed. When printing is started, the printing head motor 27 shown in FIG. 4, for example, is driven so that the printing head urging force corresponds to the detected surface roughness.

Alternatively, the needle contact type surface roughness detector 61 may be mounted so that the contact needle 61*a* is brought into contact with the recording paper P when the recording paper P is to be set. In this case, the surface roughness of the recording paper P is detected when the recording paper P is fed to be set. Since the needle contact type surface roughness detector 61 need not be moved by the carriage 60, the detector 61 can be mounted on a position other than the carriage 60 such as a frame.

Figure 8:
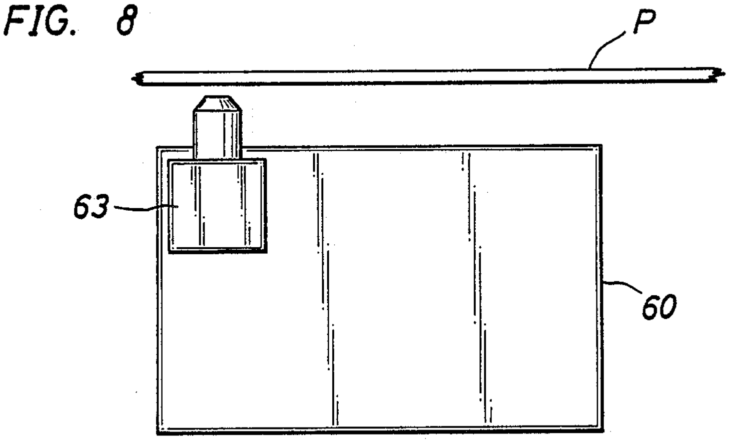
FIG. 8 is a view showing a modification of the surface roughness measuring device.

FIG. 8 shows a modification of the surface roughness measuring device. This surface roughness measuring device includes a carriage 60, a reflecting photoelectric detector 63 mounted to oppose recording paper P, and a signal processor (not shown) for the detector 63. In surface roughness detecting processing, the carriage 60 is moved by a predetermined distance, and the surface roughness of the recording paper P is obtained on the basis of a detection signal (corresponding to a reflected light amount from the recording paper P) output from the detector 63 during movement. Alternatively, in the surface roughness detecting processing, while a test of black printing is performed, the detector 63 is operated to emit light to a black-printed portion, and the surface roughness of the recording paper P is obtained on the basis of a reception signal of reflected light.

Figure 9:
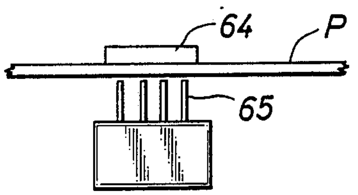
FIG. 9 is a view showing another modification of the surface roughness measuring device.

FIG. 9 shows a modification of the surface roughness measuring device. This surface roughness measuring device includes a common electrode 64 and a plurality of detection electrodes 65 arranged such that recording paper P is sandwiched between the common electrode 64 and the detection electrodes 65. In this case, an electric capacitance between the common electrode 64 and each detection electrode 65 is measured, and the surface roughness of the recording paper P is obtained on the basis of variations in the measured electric capacitance.

Figure 10:
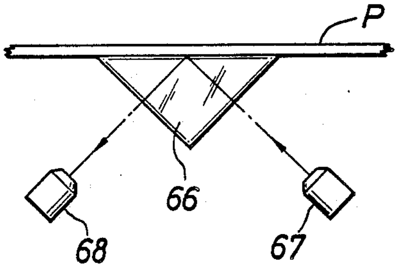
FIG. 10 is a view showing still another modification of the surface roughness measuring device.
Figure 11:
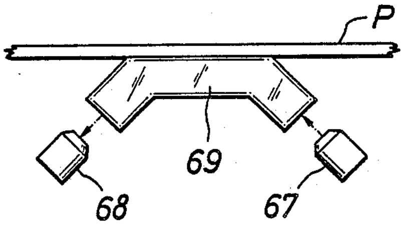
FIG. 11 is a view showing still another modification of the surface roughness measuring device.

FIG. 10 shows a modification of the surface roughness measuring device. This surface roughness measuring device includes a prism 66 mounted on a carriage so as to be brought into contact with the printing surface of the recording paper P, a light-emitting device 67 for emitting light on one end face of the prism 66, a light-receiving device 68 for receiving light emitted from the other end face of the prism, and a signal processor (not shown) for a light-reception signal. In accordance with the surface roughness of the recording paper P, a state of an interface of the prism 66 changes and an amount of light incident on the light-receiving device 68 changes. Therefore, the surface roughness of the recording paper P is obtained on the basis of the light-reception signal from the light-receiving device 68. Instead of the prism 66, a waveguide 69 may be used as shown in FIG. 11. Alternatively, an ultrasonic wave may be transmitted on the printing surface of the recording paper P, and the surface roughness may be obtained on the basis of a reception signal of a reflected wave.

Figure 12:
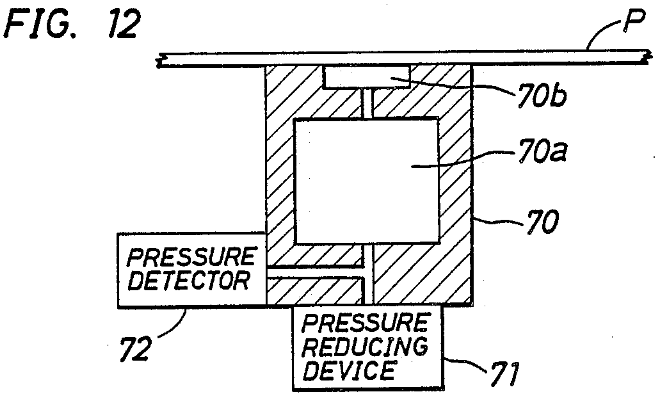
FIG. 12 is a view showing still another modification of the surface roughness measuring device.

FIG. 12 shows a modification of the surface roughness measuring device. This surface roughness measuring device includes a probe 70 having a reduced-pressure chamber 70*a* and an air inlet port 70*b* communicating with the reduced-pressure chamber 70*a*, a pressure reducing device 71 for reducing the pressure in the reduced-pressure chamber 70*a*, and a pressure detector 72 for detecting the pressure in the reduced-pressure chamber 70*a*. The probe 70 is mounted on, e.g., a carriage so that an end face in which the air inlet port 70*b* is open is brought into tight contact with the printing surface of recording paper P during surface roughness detecting processing. In order to detect the surface roughness, the pressure of the reduced-pressure chamber 70*a* is reduced to be predetermined pressure by the pressure reducing device 71. When pressure reduction is stopped, an air flows from the air inlet port 70*b* to the reduced-pressure chamber 70*a* through a gap formed between the probe 70 and the recording paper P. A time required for the pressure in the reduced-pressure chamber 70*a* after pressure reduction is stopped to return to that before pressure reduction corresponds to the surface roughness of the recording paper P. That is, the larger the surface roughness is, the shorter the time required for the pressure in the reduced-pressure chamber 70*a* to return to its original pressure becomes. Therefore, the surface roughness is obtained by measuring the time.

Meanwhile, a means for detecting the type of an ink ribbon is not limited to that shown in FIGS. 5A and 5B. For example, a label having thereon a bar code for identifying the type of an ink ribbon may be adhered on a predetermined position of a cassette so that the bar code is read by an optical reader. Alternatively, a magnetic tape on which the type of an ink ribbon is recorded is adhered on a cassette so as to be read by a magnetic head. If the type of an ink ribbon is detected by such means, a recess portion need not be formed in a cassette, as shown in FIGS. 5A and 5B. As a result, since cassettes having the same shape can be used, the cassettes can be advantageously mass-produced.

In the embodiment of FIG. 6, the type of an ink ribbon is detected by the discriminator 44. However, set buttons (e.g., "Color", "Black", and "Multi") for setting the type of an ink ribbon may be provided to the operation unit of the printer so that a user can select the type of an ink ribbon by operating these buttons. In this case, the CPU 1 controls the printing head motor 27 in accordance with the type of an ink ribbon set by the buttons and switches the urging force of the printing head 21. Alternatively, set buttons (e.g., "Rough" and "OHP" ) for setting the surface roughness of recording paper may be provided so that a user can select the surface roughness of the recording paper and the urging force of the printing head is switched in accordance with the selected surface roughness. Furthermore, both of the type of an ink ribbon and the surface roughness of recording paper may be set so that the urging force is switched in accordance with a combination of both.

When a stepping motor is used as the printing head motor 27 as in the above embodiment, only the urging release position detector 41 of the three cam position detectors 41, 42, and 43 may be used. In this case, the number of pulses required for rotating the cam 32 a $\frac{1}{3}$ time from the urging release position are supplied to the motor 27. As a result, the motor 27 is rotated in the forward or reverse direction, and the cam 32 is rotated to the strong or weak urging position. Alternatively, the strong and weak urging position detectors 42 and 43 of the three detectors 41 to 43 may be used to supply the number of pulses required for rotating the cam 32 a $\frac{1}{3}$ time from the strong or weak urging position to the motor 27. As a result, the motor 27 is rotated in the forward or reverse direction, and the cam 32 is rotated to the urging release position.

Furthermore, in the above embodiment, an urging force is switched using a single cam. However, the urging force may be switched using a plurality of cams. Moreover, the urging force may be switched in three or more steps. The head urging force may be set more precisely in accordance with the type of an ink ribbon and/or the roughness of paper surface.

As has been described above, according to the present invention, an urging force of a printing head is automatically set in accordance with the type of an ink ribbon and/or surface roughness of recording paper. Therefore, the urging force of the printing head can be optimally set, and good printing quality can always be obtained.

What is claimed is:

1. A thermal transfer printer for printing on recording paper with an ink ribbon comprising:

a head holding member for holding a printing head and applying an urging force for urging said printing head against a platen and for separating said printing head from said platen;

an elastic member for biasing said head holding member so that said printing head is urged against said platen;

regulating means for regulating displacement of said elastic member to change the urging force urging said printing head against said platen;

driving means for driving said regulating means;

ink ribbon detecting means for detecting the type of ink ribbon and generating an ink ribbon type signal in response thereto; and control means for controlling said driving means in response to said ink ribbon type signal whereby the urging force of said printing head is changed in accordance with the type of ink ribbon.

2. A thermal transfer printer according to claim 1, wherein said regulating means includes a movable member capable of moving toward and away from said head holding member and at least one cam disposed between said head holding member and said movable member, said elastic member coupling said head holding member and said movable member in a direction to engage said cam positioned therebetween, said cam having an urging release position at which said head holding member is moved away from the rotational axis of said cam to separate said printing head from said platen and a plurality of urging positions where said movable member is moved away from the rotational axis of said cam a predetermined distance and said printing head is urged against a platen.

3. A printer to claim 2, wherein said plurality of urging positions includes a strong urging position and a weak urging position.

4. A printer according to claim 2, further comprising cam position detecting means for detecting the urging release position and the urging positions of said cam, wherein the cam position detecting means generates an output for controlling the rotation of the cam.

5. A printer according to claim 2, further comprising urging release position detecting means for detecting the urging release position of said cam, wherein said driving means comprises a stepping motor, and rotation of said stepping motor by a predetermined amount controls the rotation of the cam from the urging release position to the urging positions.

6. A printer according to claim 2, further comprising urging position detecting means for detecting the urging positions of said cam, wherein said driving means comprises a stepping motor, and rotation of the stepping motor a predetermined amount controls the rotation of said cam from the urging position to the urging release position.

7. A printer according to claim 2, further including a plurality of cams for varying said urging force.

8. A printer according to claim 1, wherein said ink ribbon is disposed in an ink ribbon cassette and said ink ribbon detecting means includes a discrimination portion formed on the ink ribbon cassette for determining the ink ribbon type.

9. A printer according to claim 1, further including surface roughness detecting means for detecting the surface roughness of the recording paper and generating a surface roughness type signal in response thereto, said control means controlling said driving means in response to said surface roughness type signal, whereby the urging force of the printing head is changed in accordance with the surface roughness of the recording paper.

10. A thermal transfer printer for printing on recording paper with an ink ribbon comprising:

a head holding member for holding a printing head and applying an urging force for urging said printing head against a platen and for separating said printing head from said platen;

an elastic member for biasing said head holding member so that said printing head is urged against said platen;

regulating means for regulating displacement of said elastic member to change the urging force urging said printing head against said platen;

driving means for driving said regulating means;

surface roughness detecting means for detecting the surface roughness of the recording paper and generating a surface roughness type signal in response thereto; and control means for controlling said driving means in response to said surface roughness type signal whereby the urging force of said printing head is changed in accordance with the surface roughness of the recording paper.

11. A printer according to claim 10, wherein said surface roughness detecting means includes a needle member, contacting the recording paper and vibrating in accordance with the surface roughness of the recording paper and a vibration sensor for converting the vibration of said needle member into said surface roughness type signal.

12. A printer according to claim 10, wherein said surface roughness detecting means includes light-emitting means for emitting light onto the recording paper and light-receiving means for receiving reflected light from the recording paper, said light-receiving means generating said surface roughness type signal.

13. A printer according to claim 10, wherein said surface roughness detecting means includes a plurality of pairs of electrodes disposed above and below the recording paper, for measuring the electrostatic capacitance between each pair of electrodes, thereby detecting the surface roughness of the recording paper in accordance with variations in the measured capacitance.

14. A printer according to claim 10, wherein said surface roughness detecting means includes pressure-sensitive means for contacting the recording paper and for detecting the surface roughness of the recording paper in accordance with pressure changes measured by said pressure-sensitive means.

15. A thermal transfer printer for printing on recording paper with an ink ribbon comprising:

a head holding member for holding a printing head and applying a force for urging said printing head against a platen and for separating said printing head from said platen;

an elastic member for biasing said head holding member so that printing head is urged against said platen;

a regulating member for regulating displacement of said elastic member to change the urging force urging said printing head against said platen;

driving means for driving said regulating member;

ink ribbon setting means for setting a value indicative of the type of ink ribbon; and control means for controlling said driving means in accordance with the set value for said ink ribbon setting means, whereby the urging force of said printing head is changed in accordance with the type of ink ribbon.

16. A printer according to claim 15, further including surface roughness setting means for setting a value indicative of the surface roughness of the recording paper, said control means controlling said driving means in accordance with the set values of the surface roughness setting means, whereby the urging force of the printing head is changed in accordance with the surface roughness of the recording paper.

17. A thermal transfer printer for printing on recording paper with an ink ribbon comprising:

a head holding member for holding a printing head and applying a force for urging said printing head against a platen and for separating said printing head from said platen;

an elastic member for biasing said head holding member so that said printing head is urged against said platen;

a regulating member for regulating displacement of said elastic member to change the urging force urging said printing head against said platen;

driving means for driving said regulating member;

surface roughness setting means for setting a value indicative of the surface roughness of the recording paper; and control means for controlling said driving means in accordance with the set value for said surface roughness setting means, whereby the urging force of said printing head is changed in accordance with the surface roughness of the recording paper.

* * * * *